United States Patent
Zeng et al.

(10) Patent No.: US 12,342,095 B2
(45) Date of Patent: Jun. 24, 2025

(54) MID-INFRARED UPCONVERSION IMAGING METHOD AND DEVICE

(71) Applicants: Chongqing Institute of East China Normal University, Chongqing (CN); East China Normal University, Shanghai (CN); Yunnan Huapu Quantum Material Co., Ltd, Yunnan (CN); ROI Optoelectronics Technology CO., LTD., Shanghai (CN); Chongqing Huapu New Energy Co.,Ltd., Chongqing (CN); Chongqing Huapu Information Technology Co.,Ltd., Chongqing (CN); Nanjing ROI Optoelectronics Technology Co.,Ltd., Jiangsu (CN)

(72) Inventors: Heping Zeng, Chongqing (CN); Yinqi Wang, Chongqing (CN); Kun Huang, Chongqing (CN); Mengyun Hu, Chongqing (CN)

(73) Assignees: CHONGQING INSTITUTE OF EAST CHINA NORMAL UNIVERSITY, Chingqing (CN); EAST CHINA NORMAL UNIVERSITY, Shanghai (CN); YUNNAN HUAPU QUANTUM MATERIAL CO., LTD, Yunnan (CN); ROI OPTOELECTRONICS TECHNOLOGY CO, LTD., Shanghai (CN); CHONGQING HUAPU NEW ENERGY CO., LTD., Chongqing (CN); CHONGQING HUAPU INFORMATION TECHNOLOGY CO., LTD., Chingqing (CN); NANJING ROI OPTOELECTRONICS TECHNOLOGY CO., LTD., Jiangsu (CN)

( * ) Notice: Subject to any disclaimer, the term of this patent is extended or adjusted under 35 U.S.C. 154(b) by 387 days.

(21) Appl. No.: 17/936,070

(22) Filed: Sep. 28, 2022

(65) Prior Publication Data

US 2023/0099476 A1  Mar. 30, 2023

(30) Foreign Application Priority Data

Sep. 29, 2021 (CN) .......................... 202111150237.4

(51) Int. Cl.
*H04N 5/33* (2023.01)
*G01N 21/01* (2006.01)
(Continued)

(52) U.S. Cl.
CPC ............... *H04N 5/33* (2013.01); *G01N 21/01* (2013.01); *G01N 21/35* (2013.01); *G02F 1/3548* (2021.01);
(Continued)

(58) Field of Classification Search
CPC ............ G02F 2203/15; G02F 2203/54; G01N 2021/0112; G01N 21/01
See application file for complete search history.

(56) References Cited

U.S. PATENT DOCUMENTS

| 6,687,051 | B1 * | 2/2004 | Wang ..................... G02B 23/12 |
| | | | 359/361 |
| 7,696,479 | B2 * | 4/2010 | DeCamp ................ G01N 21/35 |
| | | | 250/339.06 |

(Continued)

OTHER PUBLICATIONS

Ashik A. S., Callum F. OâDonnell, S. Chaitanya Kumar, M. Ebrahim-Zadeh, P. Tidemand-Lichtenberg, and C. Pedersen, "Mid-infrared upconversion imaging using femtosecond pulses," Photon. Res. 7, 783-791 (2019) (Year: 2019).*

(Continued)

*Primary Examiner* — David J Makiya
*Assistant Examiner* — Soorena Kefayati
(74) *Attorney, Agent, or Firm* — Hodgson Russ LLP

(57) ABSTRACT

A mid-infrared upconversion imaging method and a mid-infrared upconversion imaging device are provided, which are used for imaging detection in a mid-infrared wavelength band, and related to a technical field of infrared imaging. The method includes directing pump laser and mid-infrared light into a chirped crystal component located in an optical cavity to obtain visible light; and imaging an object with the visible light.

14 Claims, 2 Drawing Sheets

(51) Int. Cl.
  *G01N 21/35* (2014.01)
  *G02F 1/35* (2006.01)
  *H04N 23/957* (2023.01)

(52) U.S. Cl.
  CPC ... *H04N 23/957* (2023.01); *G01N 2021/0112* (2013.01)

(56) References Cited

U.S. PATENT DOCUMENTS

| | | | | |
|---|---|---|---|---|
| 10,824,049 B1* | 11/2020 | Yap | | H01S 3/108 |
| 2008/0075130 A1* | 3/2008 | Mizuuchi | | H04N 9/3129 |
| | | | | 348/E9.026 |
| 2009/0323172 A1* | 12/2009 | Furuya | | G02F 1/3775 |
| | | | | 359/326 |
| 2011/0026102 A1* | 2/2011 | Starodubov | | H01S 3/0675 |
| | | | | 359/326 |
| 2011/0228807 A1* | 9/2011 | Pedersen | | H01S 3/1083 |
| | | | | 372/98 |
| 2011/0273763 A1* | 11/2011 | Kaertner | | G02F 1/39 |
| | | | | 359/330 |
| 2013/0063807 A1* | 3/2013 | Dam | | G02F 1/3534 |
| | | | | 359/326 |
| 2014/0063591 A1* | 3/2014 | Hu | | H01S 3/0078 |
| | | | | 359/326 |
| 2014/0133011 A1* | 5/2014 | Schwedt | | G02B 21/0076 |
| | | | | 359/388 |
| 2015/0139262 A1* | 5/2015 | Reis | | G02F 1/3551 |
| | | | | 372/64 |
| 2015/0355447 A1* | 12/2015 | Dam | | G02B 21/002 |
| | | | | 359/326 |
| 2015/0362718 A1* | 12/2015 | Dam | | G01J 3/2823 |
| | | | | 359/326 |
| 2016/0061655 A1* | 3/2016 | Nozawa | | G01J 1/0407 |
| | | | | 250/578.1 |
| 2020/0110326 A1* | 4/2020 | Suchowski | | H04N 23/21 |
| 2020/0209709 A1* | 7/2020 | Suchowski | | G02F 1/355 |
| 2020/0405540 A1* | 12/2020 | Flanders | | A61F 9/00814 |

OTHER PUBLICATIONS

H. Maestre, A. J. Torregrosa, C. R. FernÃ,ndez-Pousa, and J. Capmany, "IR-to-visible image upconverter under nonlinear crystal thermal gradient operation," Opt. Express 26, 1133-1144 (2018) (Year: 2018).*

Anna V. Paterova et al. ,Hyperspectral infrared microscopy with visible light.Sci. Adv.6,eabd0460(2020) (Year: 2020).*

Lingwei Zhao, Lei Liu, Wei Zhao, Chuan Guo, Hongyan Wang, and Weihong Hua "Mid-infrared upconversion imaging pumped by sub-nanosecond micro-cavity laser", Proc. SPIE 11046, Fifth International Symposium on Laser Interaction with Matter, 1104607 (Mar. 29, 2019); (Year: 2019).*

CNIPA, First Office Action for CN Application No. 202111150237.4, Nov. 30, 2023.

* cited by examiner

MID-INFRARED UPCONVERSION IMAGING METHOD AND DEVICE

CROSS-REFERENCE TO RELATED APPLICATION

This application claims priority to and benefits of Chinese Patent Application No. 202111150237.4, filed on Sep. 29, 2021, the entire disclosure of which is incorporated herein by reference.

FIELD

The present disclosure relates to a technical field of infrared imaging, and more particularly to a mid-infrared upconversion imaging method and a mid-infrared upconversion imaging device.

BACKGROUND

The research of ultra-sensitive detection in a mid-infrared wavelength band has become a hotspot in the world, which is not only used to develop infrared precision spectroscopy, infrared ultrafast photonics, and infrared space astronomy, but also has significance in major military and national defense applications such as free space communication, missile imaging, tracking and positioning, and civil industries such as air pollution monitoring and material processing. In addition, since the infrared imaging technology has a long operating range, good anti-interference, and strong ability to penetrate haze, and may work all day, it may be widely used in military, industrial and biomedical fields, such as detection and identification of military targets, material defect detection, topography analysis, biological imaging detection.

SUMMARY

In a first aspect, a mid-infrared upconversion imaging method is provided. The method includes directing laser and mid-infrared light into a chirped crystal component located in an optical cavity to obtain visible light; and imaging an object with the visible light.

In some embodiments, the chirp crystal component is lithium niobate (LN) crystal, lithium tantalate (LT) crystal, or potassium titanium phosphate (KTP) crystal.

In a second aspect, a mid-infrared upconversion imaging device is provided. The device includes a pump light source configured to emit pump light; a mid-infrared light source configured to emit signal light; a stage, on which an object to be tested is placed; an optical cavity; a first focusing lens and a second focusing lens placed in front of and behind the optical cavity, respectively; a frequency upconversion system comprising a chirped crystal component; and a charge coupled device configured to image the object. The chirped crystal component is located at a position where focal points of the first focusing lens and the second focusing lens overlap to form an imaging system. The pump light is incident into the optical cavity to superimpose the pump light in the optical cavity to increase average power. The signal light passes through a plane of the object to carry object information, and enters the optical cavity through the first focusing lens. The pump light and the signal light enter the chirped crystal component. In response to meeting a phase matching condition, the signal light in a mid-infrared wavelength band is converted to light in a visible wavelength band.

In some embodiments, the optical cavity is a four-mirror travelling-wave cavity having a bowknot shape.

In some embodiments, the imaging system is a 4f imaging system.

In some embodiments, the object to be tested comprises a biological cell, an industrial material, or a mask plate.

In some embodiments, the mid-infrared upconversion imaging device further includes a feedback control system comprising a locking system and a feedback driving element, and configured to lock the optical cavity.

In some embodiments, the chirped crystal component comprises a lithium niobate (LN) crystal, a lithium tantalate (LT) crystal, or a potassium titanyl phosphate (KTP) crystal.

In some embodiments, the charge coupled device is a silicon-based charge coupled device.

In some embodiments, the mid-infrared upconversion imaging device further includes a temperature-controlled furnace configured to control a temperature of the chirped crystal component.

In some embodiments, the mid-infrared upconversion imaging device further includes a filter system configured to filter the light in the visible wavelength band.

In some embodiments, each of the first focusing lens and the second focusing lens has a focal length of 100 mm.

REFERENCE NUMERALS

Figure 1A:
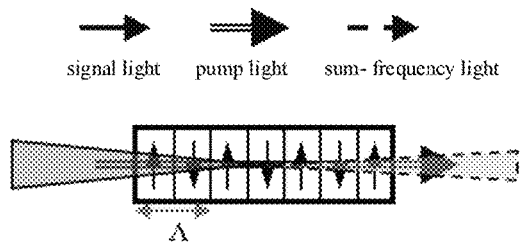
FIGS. 1A-1D is a schematic diagram showing a principle of a mid-infrared upconversion imaging method in an embodiment of the present disclosure.
Figure 1A:
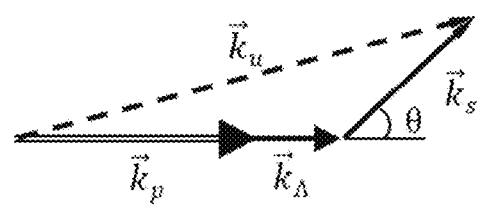

100: pump light source; 101: detector; 102: first high-reflectivity mirror; 103: second high-reflectivity mirror; 104: high-speed piezoelectric ceramic driving element; 105: feedback control system; 106: signal light source; 107: object to be tested; 108: calcium fluoride lens with focal length f=100 mm; 109: first concave lens with high transmittance in mid-infrared wavelength and high reflectivity at 1030 nm; 110: nonlinear frequency upconversion crystal component; 111: second concave lens with high transmittance at 771 nm; 112: focusing lens with focal length f=100 mm; 113: filter system; 114: silicon-based charge coupled device; 115: temperature-controlled furnace.

DETAILED DESCRIPTION

The present disclosure is further illustrated in detail in combination with embodiments shown in the accompanying drawings to facilitate the understanding of those skilled in the art.

At present, a mid-infrared imager based on mercury cadmium telluride (HgCdTe) and indium antimonide (InSb) generally need to be cooled and operates at a low temperature, and has a complex overall structure and a low detection efficiency. In addition, the imaging technology based on an infrared focal plane array detector is affected by processing materials and manufacturing processes, resulting in a degraded imaging quality caused by a nonuniform response and blind elements between detection units, and a low sensitivity compared to a Si detector that operates at a visible wavelength band. The existing mid- and far-infrared imaging detectors have a slow response speed, low sensitivity, high noise, and few pixels. In recent years, a nonlinear frequency upconversion imaging technology has been developed, which converts an infrared light field to a visible wavelength band through a nonlinear sum-frequency process, and adopts silicon-based detection and imaging devices with excellent performance, thereby achieving ultra-sensitive mid- and far-infrared imaging. However, the existing frequency up-conversion detection technology is limited by phase matching, and has a small imaging field of view. In order to broaden the field of view, crystal phase matching conditions (such as crystal temperature and angle) are adjusted, imaging targets are moved, or other mechanical scanning methods are used, such that an imaging speed is slow and single ultra-sensitive imaging with a large field of view cannot be achieved.

Therefore, there is a need to develop an ultra-sensitive mid-infrared upconversion imaging technology in a large field of view, due to the increasing application requirements in many fields, such as space detection, video surveillance, military target early warning, biological cell tissue imaging, pathological medical diagnosis and the like, which has important scientific value and broad application prospects.

In order to solve the problems existing in the related art, the present disclosure provides an ultra-sensitive mid-infrared imaging method in a large field of view based on a nonlinear frequency upconversion and a chirped polarization crystal. By using the nonlinear frequency upconversion technology, problems existing in mid-infrared imaging devices are avoided, which may make full use of superior performance of a silicon-based imaging device, and may achieve mid-infrared imaging with high sensitivity, high speed, high resolution, and high performance at room temperature compared with mid- and far-infrared focal plane imaging detection arrays. Combined with an optical external cavity enhancement technology, an effective power of narrow linewidth continuous optical pumping is increased, a nonlinear frequency conversion efficiency is improved, and a signal-to-noise ratio is improved. By adopting the chirped polarization crystal as a nonlinear medium for frequency upconversion, mid-infrared signals incident at different angles are matched with the corresponding inversion periods, thereby greatly broadening an acceptance angle of the incident signals and realizing two-dimensional imaging without mechanical scanning, which realizes the ultra-sensitive mid-infrared imaging in the large field of view.

In order to achieve the above-mentioned object, the technical solutions are as follows.

The present disclosure provides a mid-infrared upconversion imaging method for imaging detection in a mid-infrared wavelength band. The method includes: converting mid-infrared photons to a visible wavelength band by nonlinear coherent frequency shift with a nonlinear frequency upconversion imaging technology, using a silicon material detector for detection, so as to image in mid-infrared wavelength band; matching incident signals at different angles with different inversion periods using a chirped polarization crystal as a nonlinear medium, so as to obtain frequency conversion and increase a field of view of frequency upconversion imaging; using a narrow-band single-frequency continuous pumping in combination with an optical external cavity enhancement structure to increase pump light intensity. Thus, the nonlinear conversion efficiency is further improved, the signal-to-noise ratio is improved, and the high-resolution and high-efficiency coherent frequency shift of the mid- and far-infrared spectrum is realized.

In some embodiments, the nonlinear frequency upconversion imaging technology is used to perform nonlinear conversion from the mid-infrared wavelength band to the visible wavelength band at room temperature.

In some embodiments, matching incident signals at different angles with different inversion periods using the chirped polarization crystal as the nonlinear medium includes: matching the incident signal in a relatively wide angle range with the different inversion periods by optimizing an intrinsic inversion structure in the chirped polarization crystal. Thus, the field of view is widened, the single frequency up-conversion imaging in a large field of view is realized, and the collinear working mode is adopted, which simplifies the optical path, increases the length of nonlinear action, and maintains a high nonlinear conversion efficiency in the whole process.

In some embodiments, the narrow-band single-frequency continuous pumping is configured to cover infrared signal photons incident randomly in time domain, and is performed with a pump light source with a single longitudinal mode, narrow linewidth, and high spectral brightness. Thus, it is possible to improve the nonlinear conversion efficiency and avoid intensity jitter caused by laser multi-mode competition, and hence the narrow-band single-frequency continuous pumping is suitable for passive imaging.

In some embodiments, the optical external cavity enhancement structure is configured to increase pump intensity; an optical resonator is configured to spatially filter a laser transverse field mode, so as to form a Gaussian beam in the cavity. The quantum efficiency of the nonlinear frequency conversion can be increased by good spatial mode matching.

The present disclosure further provides a mid-infrared upconversion imaging device. The device includes a single-frequency continuous laser configured to emit pump light; a mid-infrared light source configured to emit signal light; an object to be tested; an optical cavity; two focusing lenses placed in front of and behind the optical cavity, respectively; a feedback control system; and a frequency upconversion system including a chirped crystal component.

The chirped crystal component is located at a position where focal points of the two lenses overlap to form an imaging system. Narrow linewidth continuous laser with amplified power is incident into the optical cavity to make the pump light superimposed in the optical cavity to increase average power. The signal light carries object information after passing through an object plane, and enters the optical cavity through the focusing lens; the pump light and the signal light enter the chirped crystal component. In response to meeting a phase matching condition, a mid-infrared wavelength band is converted to a visible wavelength band by nonlinear frequency conversion, and a silicon-based charge coupled device (CCD) is used to perform imaging detection.

In some embodiments, the optical cavity is a four-mirror travelling-wave cavity having a bowknot shape. A spot size of a waist of a beam is optimized, and an intra-cavity loss is evaluated to meet impedance matching of the incident pump light field so as to obtain optical cavity fineness required for cavity enhancement. A fully digital optical cavity locking system is used to automatically lock and smartly monitor the optical cavity, so as to increase pump light power to an order of hectowatt for nonlinear conversion.

In some embodiments, the imaging system is a 4f imaging system.

In some embodiments, the object to be tested includes, but is not limited to, a biological cell, an industrial material, or a mask plate.

In some embodiments, the feedback control system includes an intelligent locking system and a high-speed feedback driving element, and is used to lock the resonator through digital bandwidth feedback and programmable filtering. Thus, the resonator can stably operate in a long period of time, the intensity jitter and phase noise caused by optical cavity locking can be suppressed, and the detection performance of the infrared up-conversion system can be enhanced.

The beneficial effects of the present disclosure are as follows.

By adopting the nonlinear frequency upconversion imaging technology in combination with an ultra-sensitive silicon-based detection array that may work at room temperature, the problems existing in the mid-infrared imaging device are avoided, and noise caused by parametric fluorescence and blackbody thermal radiation is avoided, thereby realizing the high-sensitivity, high-speed, high-precision and high-performance mid-infrared imaging.

By adopting the chirped polarization nonlinear crystal component, that is a chirped crystal component obtained by designing a polarization inversion structure of a traditional nonlinear crystal component, it is possible to effectively match the infrared signals incident at the different angles with the different inversion periods, thereby extending the acceptance angle of the incident light, and realizing the nonlinear frequency upconversion in a large field of view.

By adopting the narrow-band single-frequency continuous pumping in combination with the optical external cavity enhancement structure to increase single-longitudinal-mode and narrow-linewidth pump light intensity in orders of magnitude, it is possible to improve the nonlinear conversion efficiency, avoid intensity jitter caused by laser multi-mode competition, and the narrow-band single-frequency continuous pumping is suitable for passive imaging, so as to achieve high-precision coherent frequency shift in the mid-infrared spectrum.

In a large field-of-view frequency upconversion technology based on a chirped polarization crystal, the chirped polarization crystal is used as a nonlinear medium to achieve high-efficiency and high-fidelity nonlinear conversion from a mid-infrared wavelength band to a visible wavelength band. The chirped crystal component is prepared by polarization with an external electric field to arrange a superlattice positive domain and a superlattice negative domain alternately along one direction. A polarization period is determined by a specific quasi-phase matching order and a wavelength of incident fundamental frequency light, and the reverse polarization period changes with different positions inside the crystal, such that the nonlinear frequency conversion on the mid-infrared light with different wavelengths may be achieved according to the different polarization periods.

Figure 1B:
Figure 1B:
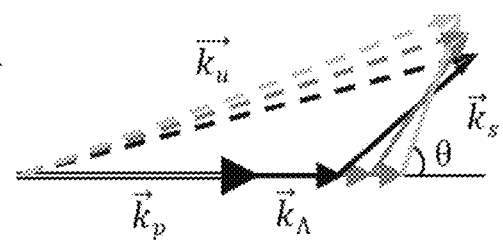
Figure 1C:
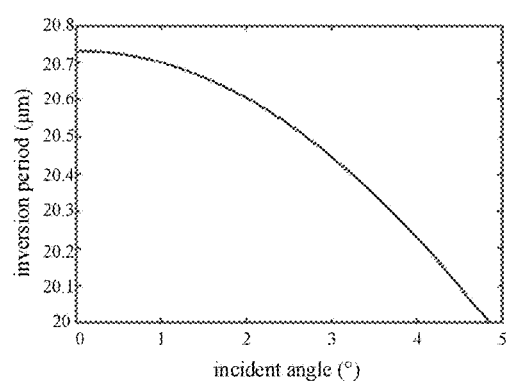
Figure 1D:
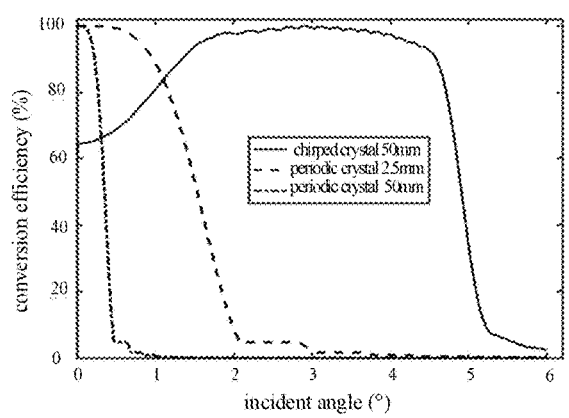
Figure 2A:
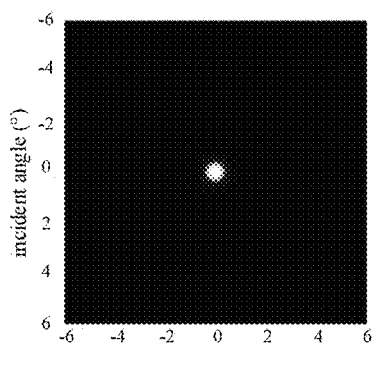
FIGS. 2A-2C are a schematic diagram showing fields of view obtained by theoretical simulation in a mid-infrared upconversion imaging method in an embodiment of the present disclosure.
Figure 2B:
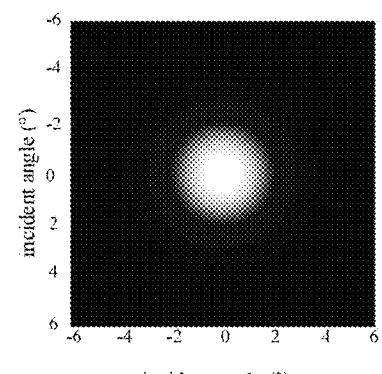
Figure 2C:
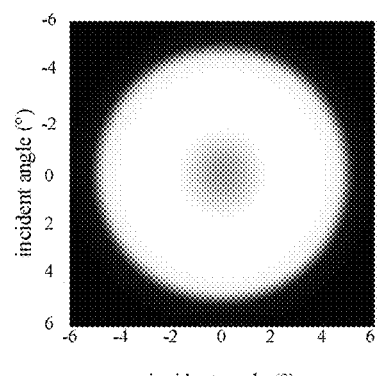

FIG. 1A is a schematic diagram showing a phase matching structure of a single-period polarization crystal, FIG. 1B is a schematic diagram showing a phase matching structure of a chirped polarization crystal, FIG. 1C is a schematic diagram showing a curve of a phase matching acceptance angle and an inversion period of a multi-period polarization crystal, and FIG. 1D is a schematic diagram showing curves of a phase matching acceptance angle and a nonlinear inversion period of a single-period polarization crystal and a chirped polarization crystal. FIG. 2A is a schematic diagram showing a field of view of a single-period polarization crystal with length L=50 mm, FIG. 2B is a schematic diagram showing a field of view of a single-period polarization crystal with length L=2.5 mm, and FIG. 2C is a schematic diagram showing a field of view of a chirped polarization crystal with length l=2.5 mm at 20 periods (L=2.5 mm*20=50 mm).

In addition, as shown in FIGS. 1A and 1B, compared with the single-period polarization crystal, the inversion period of the chirped structure is used, and an intrinsic inversion structure in the chirped polarization crystal is designed and optimized, which may obtain a larger spatial mode phase matching acceptance angle and realize a large field-of-view nonlinear optical frequency conversion. As shown in FIG. 1C, in the multi-period polarization crystal, each inversion period needs to match a specific incident angle to realize nonlinear frequency conversion, which limits the field of view for imaging. As shown in FIGS. 2A and 2B, a larger phase matching acceptance angle may only be obtained with the single-period polarization crystal having a short length, and the conversion efficiency is limited, which cannot achieve efficient nonlinear frequency conversion. Since the internal polarization period in the chirped crystal component linearly or nonlinearly changes with its position, the incident light with different angles may have a suitable inversion period to meet phase matching conditions in a collinear mode, which simplifies optical path in structure, avoids walk-off effect, and increases a length of nonlinear action, thereby greatly improving the field of view of the nonlinear frequency conversion. In addition, through precise optimization of the chirped polarization structure, a reciprocal lattice vector component contained in a single piece of crystal may compensate for phase mismatch of a wide band and a wide incident angle simultaneously, which effectively prevents energy backflow of a sum-frequency signal in operating at room temperature, thereby theoretically achieving near 100% conversion efficiency within a total phase matching bandwidth. Therefore, the incident signals at different angles in the chirped crystal component may effectively match the different inversion periods, and may meet the phase matching conditions. That is, while ensuring high conversion efficiency, the field of view of the frequency upconversion imaging is expanded. At the same time, as shown in FIG. 1D, compared with the single-period polarization crystal, the chirped nonlinear polarization crystal may maintain a high nonlinear conversion efficiency in a whole process, and may avoid distortion of the infrared spectrum amplitude information in the frequency conversion process.

In high-efficiency frequency conversion technology based on an optical cavity enhancement structure, mid-infrared photons are converted to a visible wavelength band by a nonlinear coherent frequency shift, and then a silicon material detector with excellent performance is used to detect the photons, which avoids limited sensitivity due to large noise of the existing infrared detectors in the band. During the nonlinear frequency conversion, the optical cavity is used for enhancing the pump light. The impedance matching and spatial mode control of the pump light field are realized by optimizing the cavity structure and mirror coating parameters. An optical cavity intelligent locking system is combined with a high-speed feedback driving element to make the resonator be locked with a high precision and operate stably for a long term. Therefore, the continuous pump light may undergo multiple coherent superpositions in an intracavity optical field to obtain a significant improvement of an intracavity power, which further improves the nonlinear conversion efficiency and the signal-to-noise, and achieves high-efficiency and ultra-sensitive mid-infrared frequency upconversion imaging detection.

Figure 3:
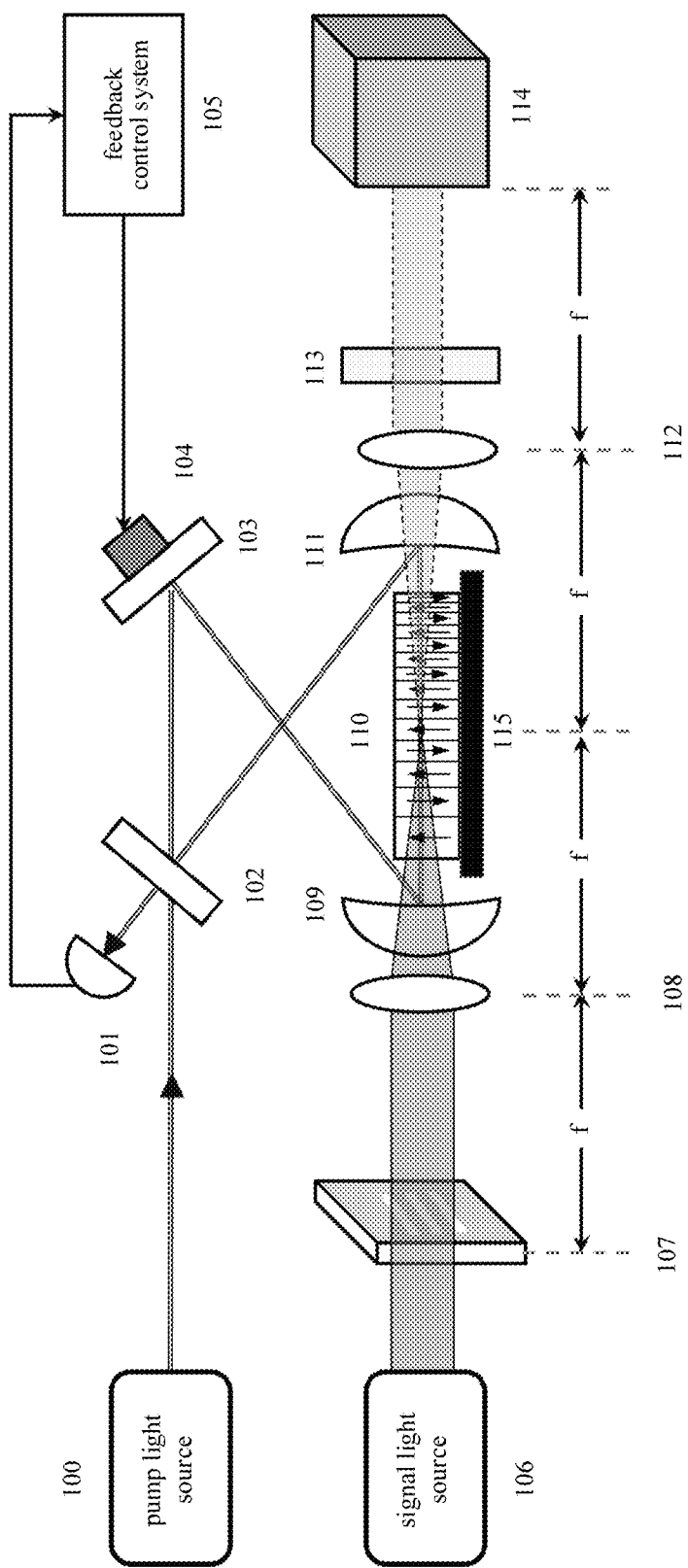
FIG. 3 is a schematic diagram showing a mid-infrared upconversion imaging device in an embodiment of the present disclosure.

As shown in FIG. 3, an ultra-sensitive mid-infrared upconversion imaging device in a large field to view includes a single-frequency continuous laser configured to emit pump light, a mid-infrared light source configured to emit signal light, an object to be tested, a four-minor travelling-wave cavity having a bowknot shape, a collection and feedback control system, and a frequency upconversion system including a chirped crystal component.

Two focusing lenses are placed in front of and behind the four-minor travelling-wave cavity, respectively, and the chirped crystal component is located at a position where focal points of the two lenses overlap to form a 4f coherent imaging system. Narrow linewidth continuous laser with initially amplified power is incident into the optical cavity, and a spot size at a beam waist position is optimized according to the three-dimensional size of the crystal. At the same time, mirror coating parameters are selected to evaluate the intracavity loss. In response to meeting an impedance matching condition of the incident pump light field, an optical cavity fineness satisfying a cavity enhancement multiple is obtained, thereby achieving a significant increase in orders of magnitude of the pump light power.

The chirped crystal component is placed on a Fourier plane of the 4f imaging system. Compared with the single-period polarization crystal or the multi-period polarization crystal, the chirped crystal component may make the mid-infrared signal light with a larger incident angle meet the phase matching condition, thereby obtaining the visible light at a larger emerging angle obtained by the nonlinear frequency upconversion to realize a larger field-of-view imaging in the 4f imaging system. As shown in FIGS. 2A and 2C, it can be seen that the field of view of the chirped crystal component is near 10 times as large as the field of view of the single-period polarization crystal at the same length.

After the frequency upconversion, a filter composed of a combination of filter plates is added, which may filter out noise interference of other stray light except the signal light obtained by sum-frequency. In addition, through a Sellmeier dispersion formula, refractive indexes of the mid-infrared light and the pump light at different incident wavelengths in the nonlinear crystal at different temperatures are calculated, and combined with phase matching conditions determined by conservation of energy and conservation of momentum under collinear conditions, to determine the inversion period of the crystal. A working temperature of the crystal is set as room temperature, such that a proportion of blackbody radiation infrared thermal background noise in a phase matching window is reduced to further reduce the noise. By using an ultra-sensitive silicon-based detection array charge coupled device (CCD) on an image plane of the 4f imaging system, the ultra-sensitive mid-infrared upconversion imaging in a large field of view may be achieved.

In addition, the ultra-sensitive mid-infrared frequency upconversion imaging technology in a large field of view may be applied to coherent light imaging, such as optical coherence tomography, laser coherent diffraction microscopy, and the like; and it may be also applied to incoherent systems to achieve the large field-of-view imaging, such as thermal radiation light source imaging, incoherent photolithography imaging, and the like, which avoids coherent noise and speckle noise in related imaging technology, improves a signal-to-noise ratio of the ultra-sensitive mid-infrared frequency upconversion imaging in a large field of view, and provides a high-sensitivity and large field-of-view imaging method for the infrared radiation thermal imaging.

The technology has a wide range of applicability in wavelength selection. For the mid-infrared wavelength band, a wavelength range of 3 to 5 μm may be selected. In this wavelength band, a lithium niobate (PPLN) crystal, a lithium tantalate (PPSLT) crystal and a potassium titanyl phosphate (PPKTP) crystal may participate in nonlinear frequency conversion. In addition, a continuous laser with a central wavelength of 980 nm, 1030 nm or 1064 nm may be selected as the pump light source, and the wavelength range of the sum-frequency signal light is in a range of 739 nm to 877 nm, which is in a response wavelength range of the silicon-based CCD, such that a high-speed and high-sensitivity detection may be realized. In addition, the nonlinear medium used for quasi-phase matching may be a crystal suitable for the mid- and far-infrared wavelength band of 3 to 12 μm, for example, a nonlinear semiconductor crystal grown based on directional patterning techniques, such as orientation-patterned gallium phosphide (OP-GaP) or orientation-patterned gallium arsenide (OP-GaAs), such that the large field-of-view ultra-sensitive imaging may be expanded to the far-infrared wavelength band.

In order to further clearly illustrate the structure of the large field-of-view ultra-sensitive mid-infrared frequency upconversion imaging system, a mid-infrared signal with a central wavelength of 3070 nm is selected in an embodiment. The central wavelength of the pump light is selected as 1030 nm, and the wavelength of the sum-frequency light is 771 nm, which is in the response wavelength range of the silicon-based CCD, such that the ultra-sensitive imaging detection may be realized. The implementation method will be described in detail below, as shown in FIG. 3.

The large field-of-view ultra-sensitive mid-infrared frequency upconversion imaging system includes a pump light source 100, a detector 101, a first mirror 102 with high reflectivity at 1030 nm, a second mirror 103 with high reflectivity at 1030 nm, a high-speed piezoelectric ceramic driving element 104, a feedback control system 105, a signal light source 106, an object 107 to be tested, a calcium fluoride lens 108 with a focal length f=100 mm, a first concave lens 109 with high transmittance in mid-infrared wavelength and high reflectivity at 1030 nm, a nonlinear frequency upconversion crystal component 110, a second concave lens 111 with high transmittance at 771 nm, a focusing lens 112 with a focal length f=100 mm, a filter system 113, a silicon-based CCD 114, and a temperature-controlled furnace 115.

The pump light source 100 is a narrow linewidth single-frequency laser with an average power of an order of watts and a wavelength of 1030 nm after preliminary amplification.

The detector 101 is a lock detector, and is configured to record and transmit an error signal to the feedback control system 105.

Both the first mirror 102 and the second mirror 103 have high reflectivity at 1030 nm.

The high-speed piezoelectric ceramic driving element 104 is configured to convert an electrical signal into a mechanical displacement and adjust the control system, and has a small size, an extremely high displacement resolution, a fast response speed, a low driving voltage, and a large output force.

The feedback control system 105 is a high-speed intelligent collection and control system, and is configured to precisely lock a resonator length through digital bandwidth feedback and programming control, thereby achieving long-term stable operation of the cavity resonator.

The signal light source 106 is a mid-infrared pulsed laser with a central wavelength of 3070 nm.

The object 107 to be tested is a 1951 USAF resolution test target.

The calcium fluoride lens 108 with the focal length f=100 mm has relatively high transmittance to mid-infrared light.

The first concave mirror 109 has high transmittance to mid-infrared light and high reflectivity to light at 1030 nm, and is configured to make the mid-infrared light enter the cavity, and the light at 1030 nm be reflected in the cavity.

The nonlinear frequency upconversion crystal 110 is a polarized lithium niobate chirped crystal component.

The second concave mirror 111 has a high transmittance to light with a wavelength of 771 nm obtained through nonlinear frequency conversion, and has a relatively high reflectivity to light of 1030 nm.

The focusing lens 112 with a focal length f=100 mm is a BK7 lens, and has relatively high transmittance to light at a wavelength of 771 nm.

The filter system 113 has relatively high transmittance to the light obtained by nonlinear frequency upconversion, that is, the light with a wavelength of 771 nm, and has relatively high reflectivity to light in other wavelength bands, which may effectively reduce noise.

The silicon-based CCD 114 is an electron multiplying CCD (EMCCD), and is configured to realize ultra-sensitive detection of light in a visible wavelength band.

The temperature-controlled furnace 115 is configured to provide a suitable temperature for the chirped crystal component to meet the phase matching conditions, and realize high-efficiency nonlinear frequency upconversion.

In an embodiment, single-frequency laser with a wavelength of 1030 nm from the pump light source 100 first passes through a high-power amplifier to amplify power, and is incident onto the first mirror 102 to enter the cavity enhancement structure. After passing through the second plane mirror 103, the first concave lens 109, and the second concave lens 111, the single-frequency laser with the wavelength of 1030 nm is coherently superimposed for multiple times in the cavity to increase the power by orders of magnitude.

The high-speed piezoelectric ceramic driving element 104 is located on the second mirror 103, and combined with the detector 101 and the feedback control system 105 to achieve precise control of the resonator, which improves the locking accuracy and stability of the optical cavity, and improves the coherence of the nonlinear frequency conversion.

Mid-infrared light with a central wavelength of 3070 nm from the signal light source 106 passes through the 1951 USAF resolution test target 107 located at an object plane of the 4f imaging system, and then enters the chirped crystal component 110 located in the Fourier plane through the focusing lens 108 and the first concave mirror 109.

The high-power single-frequency laser with a wavelength of 1030 nm and the signal light with a wavelength of 3070 nm carrying mask information are focused on the chirped crystal component 110, and the temperature-controlled furnace 115 is used to obtain a suitable temperature to meet the phase matching conditions and achieve nonlinear frequency upconversion, so as to generate sum-frequency light with a wavelength of 771 nm.

The generated sum-frequency visible light with a wavelength of 771 nm is output from the optical cavity through the second concave mirror 111, and passes through the focusing lens 112 to be collimated. The collimated light passes through the filter system 113 to filter out noise caused by the pump light, the signal light, the frequency doubled light obtained by the frequency conversion and the parametric fluorescence. After that, EMCCD is used for imaging to realize ultra-sensitive detection at a single-photon level.

The content not described in detail in the specification is well known to those skilled in the art. Finally, it is noted that the above-mentioned embodiments are only used to explain the technical solution of the present disclosure and shall not be construed as a limitation. Despite detailed description of the present disclosure is made with reference to the aforementioned embodiments, those skilled in the art should understand that they may make modifications to the technical solutions recited in the foregoing embodiments or equivalent replacements of part of the technical features, and these modifications or replacements will not make the essential of the corresponding technical solution depart from the spirit and scope of the technical solution in respective embodiments of the present disclosure.

What is claimed is:

1. A mid-infrared upconversion imaging method for imaging detection in a mid-infrared wavelength band, comprising:
    converting mid-infrared photons to a visible wavelength band by nonlinear coherent frequency shift with a nonlinear frequency upconversion imaging technology, using a silicon material detector for detection, so as to image in mid-infrared wavelength band;
    matching incident signals at different angles with different inversion periods using a chirped polarization crystal as a nonlinear medium, so as to obtain frequency conversion and increase a field of view of frequency upconversion imaging; and
    using a narrow-band single-frequency continuous pumping in combination with an optical external cavity enhancement structure to increase pump light intensity,
    wherein matching incident signals at different angles with different inversion periods using the chirped polarization crystal as the nonlinear medium comprises:
        matching the incident signal in a relatively wide angle range with the different inversion periods by optimizing an intrinsic inversion structure in the chirped polarization crystal, to widen the field of view, realize the single frequency up-conversion imaging in a large field of view, and adopt a collinear working mode.

2. The mid-infrared upconversion imaging method according to claim 1, wherein the chirped crystal component is a lithium niobate (LN) crystal, a lithium tantalate (LT) crystal, or a potassium titanyl phosphate (KTP) crystal.

3. The mid-infrared upconversion imaging method according to claim 1, wherein the nonlinear frequency upconversion imaging technology is used to perform nonlinear conversion from the mid-infrared wavelength band to the visible wavelength band at room temperature.

4. The mid-infrared upconversion imaging method according to claim 1, wherein the narrow-band single-frequency continuous pumping is configured to cover infrared signal photons incident randomly in time domain, and is performed with a pump light source with a single longitudinal mode, narrow linewidth, and high spectral brightness.

5. The mid-infrared upconversion imaging method according to claim 1, wherein the optical external cavity enhancement structure is configured to increase pump intensity; an optical resonator is configured to spatially filter a laser transverse field mode, so as to form a Gaussian beam in the cavity.

6. A mid-infrared upconversion imaging device, comprising:
- a pump light source configured to emit pump light;
- a mid-infrared light source configured to emit signal light;
- a stage, on which an object to be tested is placed;
- an optical cavity;
- a first focusing lens and a second focusing lens placed in front of and behind the optical cavity, respectively;
- a frequency upconversion system comprising a chirped crystal component; and
- a charge coupled device configured to image the object,
- wherein the chirped crystal component is located at a position where focal points of the first focusing lens and the second focusing lens overlap to form an imaging system;
- the pump light is incident into the optical cavity to superimpose the pump light in the optical cavity to increase average power;
- the signal light passes through a plane of the object to carry object information, and enters the optical cavity through the first focusing lens; and
- the pump light and the signal light enter the chirped crystal component, in response to meeting a phase matching condition, the signal light in a mid-infrared wavelength band is converted to light in a visible wavelength band,
- wherein the optical cavity is a four-mirror travelling-wave cavity having a bowknot shape.

7. The mid-infrared upconversion imaging device according to claim 6, wherein the imaging system is a 4f imaging system.

8. The mid-infrared upconversion imaging device according to claim 6, wherein the object to be tested comprises a biological cell, an industrial material, or a mask plate.

9. The mid-infrared upconversion imaging device according to claim 6, further comprising:
- a feedback control system comprising a locking system and a feedback driving element, and configured to lock the optical cavity.

10. The mid-infrared upconversion imaging device according to claim 6, wherein the chirped crystal component comprises a lithium niobate (LN) crystal, a lithium tantalate (LT) crystal, or a potassium titanyl phosphate (KTP) crystal.

11. The mid-infrared upconversion imaging device according to claim 6, wherein the charge coupled device is a silicon-based charge coupled device.

12. The mid-infrared upconversion imaging device according to claim 6, further comprising:
- a temperature-controlled furnace configured to control a temperature of the chirped crystal component.

13. The mid-infrared upconversion imaging device according to claim 6, further comprising:
- a filter system configured to filter the light in the visible wavelength band.

14. The mid-infrared upconversion imaging device according to claim 6, wherein each of the first focusing lens and the second focusing lens has a focal length of 100 mm.

* * * * *